(12) United States Patent
Kang et al.

(10) Patent No.: US 7,855,703 B1
(45) Date of Patent: Dec. 21, 2010

(54) LIQUID CRYSTAL DISPLAY AND AN INFORMATION PROCESSING APPARATUS HAVING THE SAME

(75) Inventors: Jung Tae Kang, Kyunggi-do (KR); Choong Seob Oh, Kyunggi-do (KR); Jin Ho Park, Kyunggi-do (KR); Nam Soo Kang, Kyunggi-do (KR); Jin Hyeok Park, Kyunggi-do (KR); Jong Seon Kim, Kyunggi-do (KR); Soo Han Hur, Kyunggi-do (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 282 days.

(21) Appl. No.: 09/621,825

(22) Filed: Jul. 21, 2000

(30) Foreign Application Priority Data

Jul. 21, 1999 (KR) .............................. 1999-29529
Jul. 27, 1999 (KR) .............................. 1999-30549
Jun. 8, 2000 (KR) .............................. 2000-31337

(51) Int. Cl.
*G09G 3/36* (2006.01)
(52) U.S. Cl. ......................................... 345/87; 349/58
(58) Field of Classification Search ........... 345/87–104, 345/905; 349/56, 58, 60–62; 361/681
See application file for complete search history.

(56) References Cited

U.S. PATENT DOCUMENTS 5,475,381 A * 12/1995 Williamson et al. .... 340/825.57
5,835,139 A * 11/1998 Yun et al. ..................... 349/58
5,986,726 A * 11/1999 Murai .......................... 349/59

FOREIGN PATENT DOCUMENTS

| | | |
|---|---|---|
| CN | 92201180.X | 7/1992 |
| CN | 98104272.4 | 9/1998 |
| JP | 63-26873 | 2/1988 |
| JP | 08-076886 | 3/1996 |
| JP | 08-334761 | 12/1996 |
| KR | 1996-029786 | 2/1996 |
| KR | 1019980014412 | 4/1998 |
| KR | 1999-004687 | 1/1999 |

OTHER PUBLICATIONS

English Abstract, Apr. 22, 1998, LG Philips LCD.

* cited by examiner

*Primary Examiner*—Jimmy H Nguyen
(74) *Attorney, Agent, or Firm*—Innovation Counsel LLP

(57) ABSTRACT

A liquid crystal display capable of being minimized, in which a backlight assembly has a light source portion for generating light, a liquid crystal display panel receives the light from the backlight assembly to display images. A mold frame for sequentially accepting the backlight assembly and liquid crystal display panel is formed to be gradually thinner as further advancing from a first side of accepting to place the light source portion toward a second side opposing to the first side. Also, a chassis coupled to be opposite to the mold frame for closely fixing the backlight assembly and liquid crystal display panel to the mold frame is formed to be gradually thinner as further advancing from the first side of accepting to place the light source portion toward the second side opposing to the first side. Thus, the liquid crystal display can be slimmed.

12 Claims, 14 Drawing Sheets

LIQUID CRYSTAL DISPLAY AND AN INFORMATION PROCESSING APPARATUS HAVING THE SAME

BACKGROUND OF THE INVENTION

1. Field of the Invention

The present invention relates to a liquid crystal display (hereinafter referred to as "LCD"), and more particularly to a LCD capable of performing an information processing function with minimized dimension.

2. Description of the Related Art

Recently, the advancement in the information industry has remarkably developed information processing apparatuses, such as computers. Also, the technical progress in the information processing apparatuses in turn brings about the development of monitor units that externally displays the information supplied from the information processing apparatuses.

Largely, the monitor units are classified into "CRT-type monitor units" using the characteristics of cathode ray tubes and "LCD unit-type monitor units" applied with the physical and optical characteristics of liquid crystals. The LCD unit-type monitor units, because of the advantages such as the minimization, light-weight and low power dissipation, compared to the "CRT-type monitor units," are being widely available in the display apparatus of a portable computer, a monitor of a desk-top computer and a monitor of an image apparatus of high picture quality.

The specific examples of the foregoing LCD unit-type monitor units are disclosed in U.S. Pat. No. 5,502,582 issued to Larson et al. entitled by "Light Source Cooler for LCD Monitor", U.S. Pat. No. 5,791,770 issued to Hoyt et al. in the same title, and U.S. Pat. No. 5,825,614 issued to Kim entitled by "Compact Personal Computer with LCD monitor."

Considering the above patents, the notebook computer, a kind of portable computer, has a main body for storing and processing information provided by an input unit such as a keyboard; and a monitor unit capable of swinging about the main body for displaying the information supplied from the main body thereon.

In a notebook computer, the monitor unit includes an LCD and a case. The LCD has a LCD panel assembly, a backlight assembly, a mold frame and a chassis. The LCD panel assembly has a liquid crystal panel, a signal transmission film, a source printed circuit board (hereafter, referred to as "PCB"), a gate PCB and a control board.

Here, the source PCB, gate PCB and control board are mounted to be separated from one another, and electrically connected by means of a flexible PCB for securing the signal transmission path from one another.

The control board generates a color signal, a clock signal and a power source signal in accordance with image signals. The source PCB carries out an operation for displaying the images in response to the signals supplied from the control board.

At this time, the source PCB is mounted with various portions such as a data latch section, a timing generating section, a voltage generating section, and so on to generate signals such as a driving signal and a control signal. The gate PCB is mounted with a gate voltage supplying section for generating a predetermined gate voltage in response to the control signal from the source PCB.

The aforementioned source PCB and gate PCB are mounted to the LCD in a PCB-bending manner, and bent from the side plane toward the rear plane of the LCD to be connected to the control board. Therefore, the LCD becomes as thick as the thickness of the components mounted to the source PCB.

On the other hand, the signals provided from the aforementioned information processing apparatus are of analog signals, but the LCD unit-type monitor unit is generally driven by digital signals. Accordingly, the monitor unit has an analog-digital convert circuit board for converting the analog signals supplied from the information processing apparatus into the digital signals.

The analog-digital convert circuit board is electrically connected to the control PCB by means of a connecting cable, and the control PCB is electrically connected to the source PCB by means of a flexible printed circuit board.

Once a lot of electric signals are transmitted via the flexible printed circuit board and connecting cable in a high speed, plenty of electromagnetic waves are generated from the members which electrically connect respective printed circuit boards. Thus, the electromagnetic wave serves as an inferior factor that greatly degrades the quality of the monitor unit.

Moreover, the flexible PCB and connecting cable are too expensive to satisfy the economic concern of heightening the cost of the product as well as the foregoing problem of electromagnetic wave.

Also, products provided by integrally coupling the main body of the computer system and the monitor unit is currently in great demand. However, these are just limited to the computer system applied with the CRT-type monitor unit while products provided by coupling the main body of the computer system to the LCD unit-type monitor unit have yet to be available.

SUMMARY OF THE INVENTION

Therefore, it is one object of the present invention to provide a LCD capable of minimizing the dimension of the LCD.

It is another object of the present invention to provide an information processing apparatus having a minimized LCD.

It is still another object of the present invention to provide a LCD having an information processing function.

To achieve the aforementioned object of the present invention, a liquid crystal display according to the embodiment of the present invention includes a backlight assembly having a light source portion for generating light, and a liquid crystal display panel for receiving the light from the backlight assembly to display images. Also, a mold frame for sequentially accepting the backlight assembly and liquid crystal display panel is formed to be gradually thinner as further advancing from the first side of receiving, to place the light source portion toward the second side opposition to the first side. In addition to these, a chassis coupled to be opposite to the mold frame for closely fixing the backlight assembly and liquid crystal display panel to the mold frame is formed to be gradually thinner as further advancing from the first side of receiving, to place the light source portion toward the second side opposition to the first side.

To achieve the above object of the present invention, an information processing apparatus according to the embodiment of the present invention includes a liquid crystal display panel assembly having a liquid crystal display panel and a source printed circuit board formed with a wiring pattern for signal transmission. Further to the liquid crystal display panel assembly, a backlight assembly supplies light to the display unit, a mold frame accepts the backlight assembly and display unit, and a chassis is coupled to oppose to the mold frame for closely fixing the backlight assembly and display unit. By this construction, the source printed circuit board receives a liquid crystal display panel driving signal supplied from the outside of the mold frame and chassis for driving the liquid crystal display panel to transmit the liquid crystal display panel driving signal to the liquid crystal display panel.

To achieve the above object of the present invention, a liquid crystal display according to the embodiment of the present invention is formed by a liquid crystal display module which includes a backlight assembly having a light source portion for generating light, and a liquid crystal display panel having a source printed circuit board for transmitting signals to receive the light from the backlight assembly to display images. Also included as parts of the liquid crystal display module are a mold frame for sequentially accepting the backlight assembly and liquid crystal display panel, which is formed to be gradually thinner as further advancing from the first side of receiving, to place the light source portion toward the second side in opposition to the first side, and a chassis coupled to oppose to the mold frame for closely fixing the backlight assembly and liquid crystal display panel to the mold frame, which is formed to be gradually thinner as further advancing from the first side of receiving, to place the light source portion toward the second side in opposition to the first side. In addition to the liquid crystal display module, there is provided an information processing module which has a liquid crystal display panel driving circuit for generating a driving signal for driving the liquid crystal display panel, and supplying the driving signal to the liquid crystal display panel via the source printed circuit board.

Preferably, the information processing apparatus further includes a flexible printed circuit board to electrically connect the liquid crystal display panel driving circuit and source printed circuit board. The flexible printed circuit board and the source printed circuit board are electrically coupled by means of either one of an anisotropic conductive film and a solder.

Furthermore, the information processing module is closely coupled to the rear plane of the mold frame, and the liquid crystal display module and information processing module are fixedly placed between a front case and a rear case closely coupled by being opposite to each other.

In addition, the information processing module further includes signal converting means electrically, which is coupled to the liquid crystal display panel driving circuit, for converting an analog video signal supplied from the outside of the liquid crystal display, into a digital video signal in order to supply the converted signal to the liquid crystal display panel driving circuit. Also, the liquid crystal display module further has a reinforcing bracket closely coupled to the rear plane of the mold frame.

Moreover, the liquid crystal display module is coupled to the information processing module by means of hinges and latches, the portion of placing the light source portion in the liquid crystal display module is coupled to the information processing module by means of the hinges, and an end of the portion thins as distance furthers from the light source portion is coupled to the information processing module by means of the latches.

According to the above LCD and information processing apparatus, the liquid crystal panel driving circuit which generates the driving signal for driving the liquid crystal panel, is mounted to the main body of the computer system. Accordingly, the chassis, mold frame, front and rear cases are fabricated in the form of corresponding to the light-conducting plate of the backlight assembly. By assembling the chassis, mold frame, and front and rear cases, the side plane of the LCD becomes gradually thinner as being further distanced from the position of accepting the light source portion, thereby being capable of making the LCD thinner.

In the meantime, the information processing module mounted to the main body may be accommodated between the mold frame and rear case. Once the information module is accommodated within the LCD in this manner, the advantage is that the space occupied by the main body of the computer system can be utilized for other uses when the main body of the computer system and monitor unit are separately constructed. If the information processing module is included within the internal space of the LCD, the information processing module, the liquid crystal panel driving circuit and source PCB are directly connected by means of an anisotropic conductive film, solder or the like. Consequently, the electromagnetic wave generated due to using the separate connecting member such as the flexible PCB can be minimized.

BRIEF DESCRIPTION OF THE DRAWINGS

The above objects and other advantages of the present invention will become more apparent by describing in detail preferred embodiments thereof with reference to the attached drawings in which:

FIG. 3 is a block diagram showing the circuit diagram of the computer system shown in

FIG. 1;

DETAILED DESCRIPTION OF THE EMBODIMENTS

Figure 1:
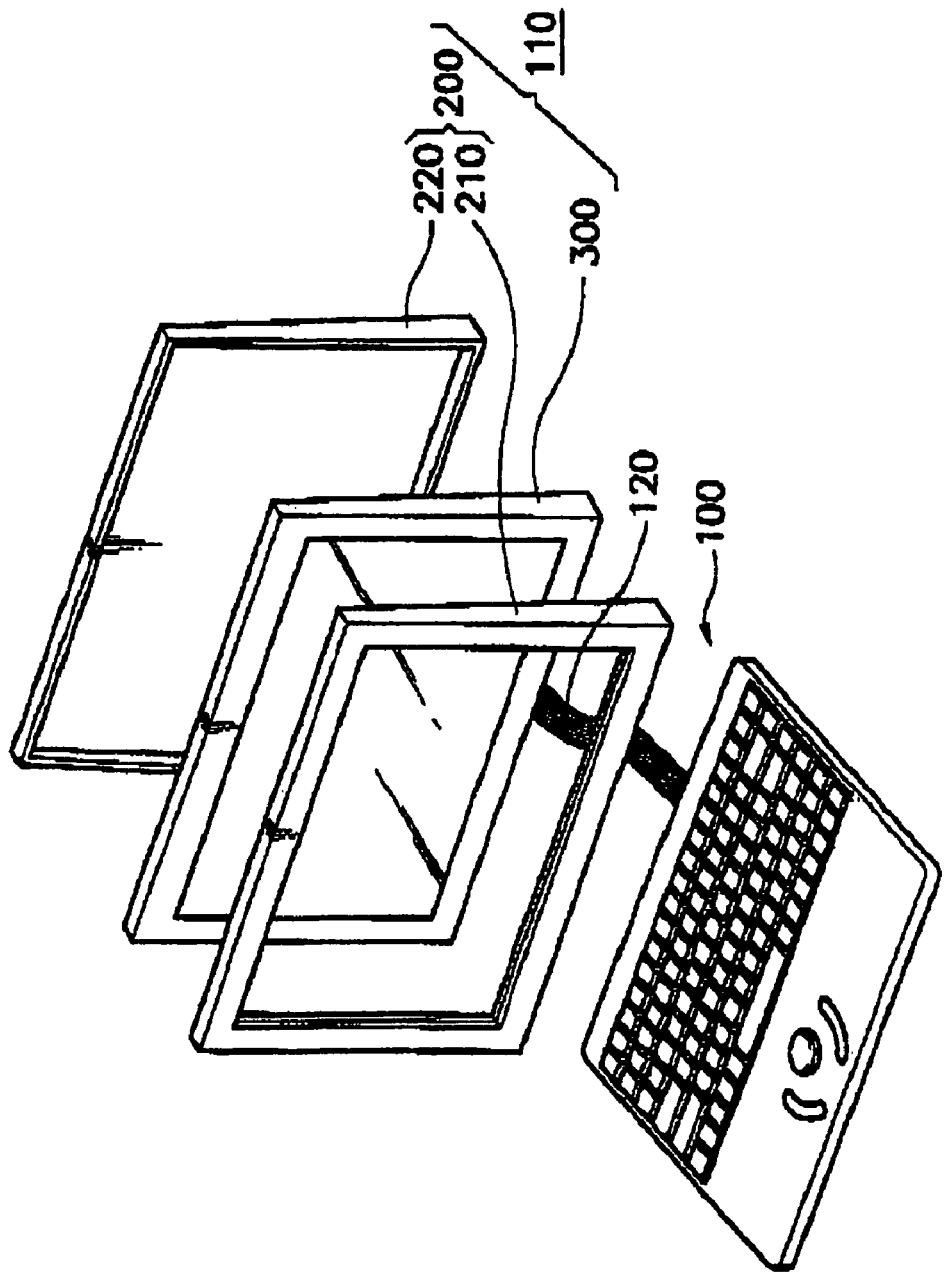
FIG. 1 is a perspective view showing a computer system having an LCD according to one preferred embodiment of the present invention.

FIG. 1 is a perspective view showing a computer system with an LCD according to one preferred embodiment of the present invention.

Referring to FIG. 1, a main body 100 of a portable computer system is coupled to a monitor unit 110 by means of a swing member (not shown).

Monitor unit 110 has an LCD 300 driven by signals from main body 100 and a case 200 for accepting to protect LCD 300. Case 200 includes a front case 210 having a bottom plane opened to correspond to a portion of displaying a picture of LCD 300 and a rear case 220 coupled for accommodating LCD 300 to be coupled to front case 210 in opposition thereto.

LCD 300 is furnished between front case 210 and rear case 220, and main body 100 and LCD 300 are electrically coupled by a flexible PCB 120 to mutually supply signals.

Figure 2:
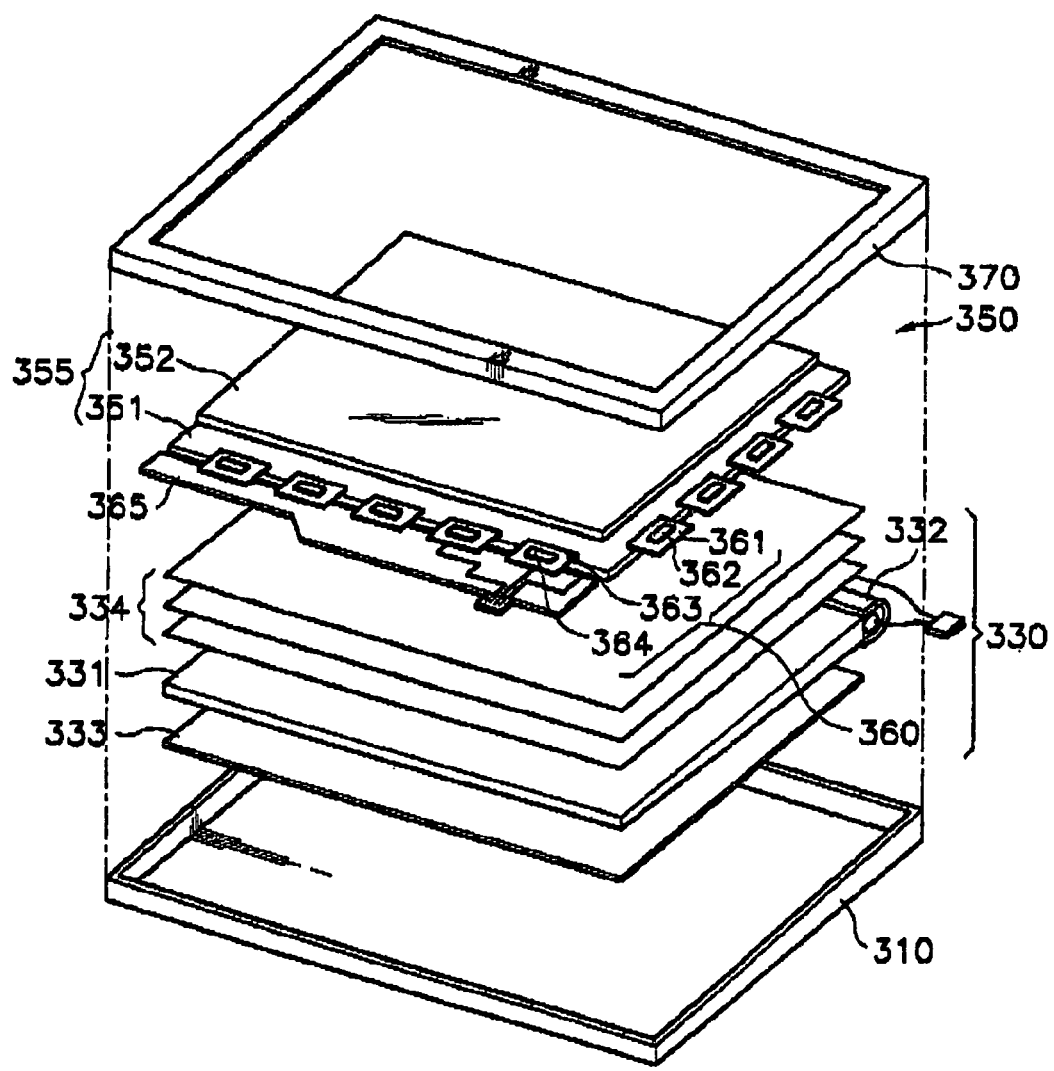
FIG. 2 is an exploded perspective view showing a construction of the LCD shown in FIG. 1.

FIG. 2 is an exploded perspective view showing a construction of the LCD shown in FIG. 1.

Referring to FIG. 2, LCD 300 has a mold frame 310 formed with receiving space. A backlight assembly 330 is placed within the receiving space of mold frame 310, and generates to guide light. A liquid crystal display panel assembly 350 provided to the upper portion of backlight assembly 330 receives the light and displays the picture. A chassis 370 is coupled to be opposite to mold frame 310, and closely fixes backlight assembly 330 and liquid crystal display panel assembly 350 into the receiving space of mold frame 310.

Backlight assembly 330 has a light source portion 332 for generating the light and a light-conducting plate 331 having one side section closely coupled to light source portion 332. Light-conducting plate 331 becomes gradually thinner as it is being further distanced from light source portion 332. A reflecting plate 333 for reflecting the light is installed to the lower side of light-conducting plate 331 and optical sheets 334 for diverging and focusing the light are installed to the upper side of light-conducting plate 331.

At this time, light-conducting plate 331 is formed in the following manner that a first side of placing light source portion 332 and a second side facing the first side differ in thickness, i.e., different heights. In other words, the thickness of light-conducting plate 331 is formed to be thinner as it is being distanced from the first side where light source portion 332 is placed. Accordingly, even though reflecting plate 333 and optical sheets 334 are installed to be closely attached to the upper and lower portions of light-conducting plate 331, the height of the first side which places light source portion 332 of backlight assembly 330 therein is different from that of the second side opposite to the first side.

Meanwhile, liquid crystal display panel assembly 350 includes a liquid crystal panel 355, a liquid crystal (not shown), a signal transmission film 360 and a source PCB 365.

Liquid crystal panel 355 has a TFT substrate 351 formed with a gate line (not shown), a data line (not shown), a thin film transistor and a pixel electrode, and a color filter substrate 352 installed over TFT substrate 351.

Signal transmission film 360 has a gate signal transmission film 361 connected to respective gate lines of TFT substrate 351 and a data signal transmission film 363 connected to the respective data lines. Gate and data signal transmission films 361 and 363 are respectively mounted with a gate driving drive IC 362 and a data driving drive IC 364 for supplying a gate driving signal and a data driving signal to the gate line and data line of TFT substrate 351.

On the other hand, source PCB 365 is formed with a wiring pattern for signal transmission that supplies the gate and data driving signals respectively to gate signal transmission film 361 and data signal transmission film 363. The gate and data driving signals are supplied from main body 100 of the computer system having the information processing function as shown in FIG. 1. That is, liquid crystal panel driving circuit 153 for generating the gate and data driving signals for driving liquid crystal panel 355 is internally furnished to main body 100.

Backlight assembly 330 and liquid crystal display panel assembly 350 are sequentially accepted within the receiving space of mold frame 310, and are closely coupled to mold frame 310 by means of chassis 370 coupled by being opposite to mold frame 310.

At this time, mold frame 310 and chassis 370 are formed so that the depth of the receiving space becomes as shallow as light source portion 332 of backlight assembly 330 is further distanced from the position of receiving light source portion 332. This is because, generally, the thickness of the side plane when coupling backlight assembly 330 with liquid crystal display panel assembly 350 is different from that of the second side plane while liquid crystal panel driving circuit 153 installed to be bent toward the rear plane of liquid crystal display panel assembly 350 by being electrically coupled to source PCB 365 is moved to main body 100.

As described above, by forming the receiving space of mold frame 310 and chassis 370 in the same depth regardless of the different thickness of the first side of placing light source portion 332 from that of the second side when coupling backlight assembly 330 and liquid crystal display panel assembly 350, an empty space exists between backlight assembly 330 and liquid crystal display panel assembly 350. Due to this fact, backlight assembly 330 and liquid crystal display panel assembly 350 cannot be firmly accepted within the interior of mold frame 310 and chassis 370. Therefore, mold frame 310 and chassis 370 are formed in a wedge shape by which the receiving space becomes gradually shallow as being further distanced from the position of receiving light source portion 332.

When mold frame 310 and chassis 370 furnished in the wedge shape are coupled to oppose to each other, both lengthwise side planes of light source portion 332 have different thickness on the first side of placing light source portion 332 from that the second side of opposing to the first side. Also, as shown in FIG. 1, front case 210 and rear case 220 are formed in the wedge shape corresponding to mold frame 310 and chassis 370. Consequently, the thickness of LCD 110 is reduced as much as the space being occupied by liquid crystal panel driving circuit 153.

Figure 3:
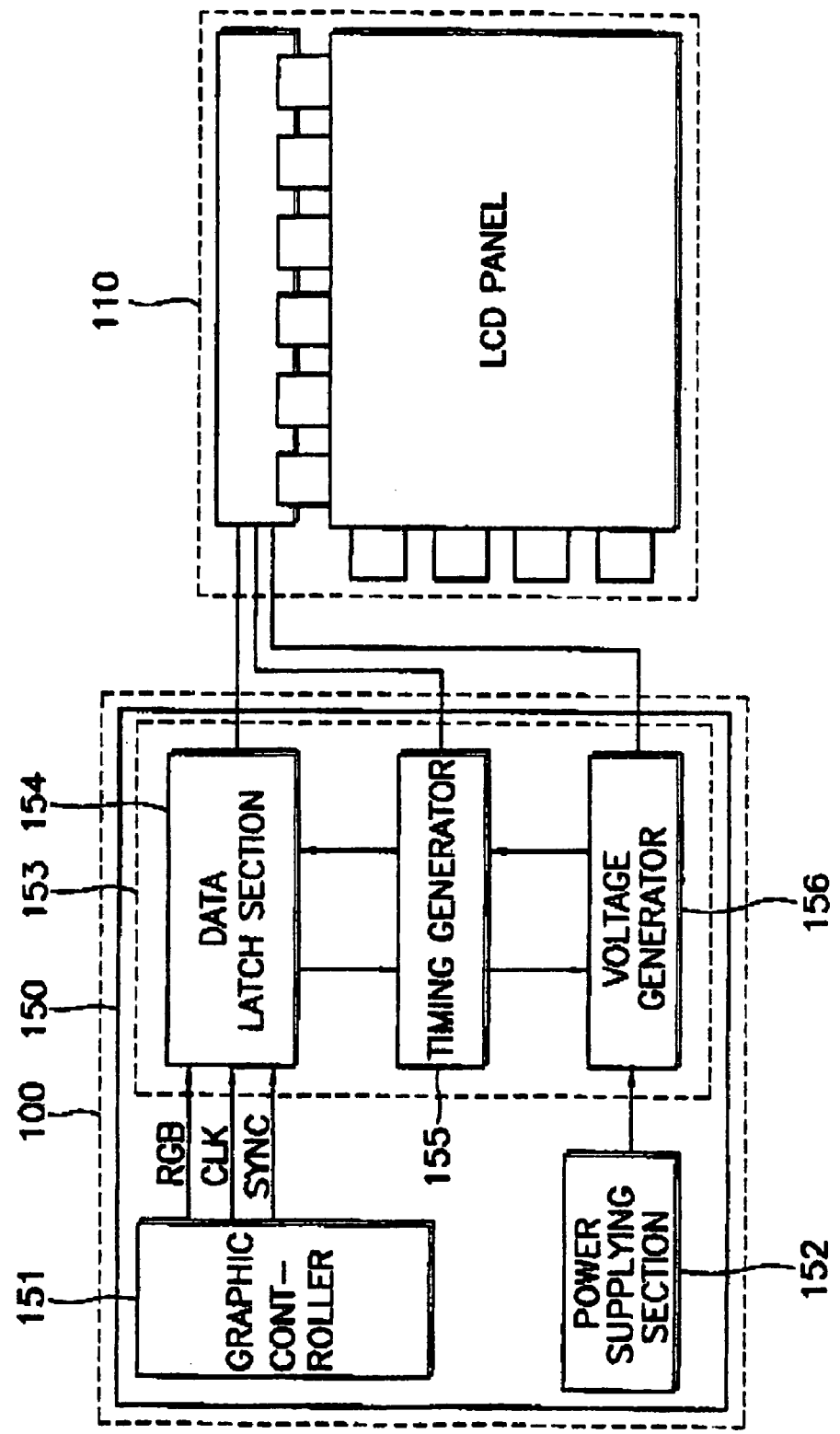

Meanwhile, the construction of main body 100 for accommodating liquid crystal panel driving circuit 153 is as shown in FIG. 3.

Referring to FIG. 3, main body 100 has a control board 150. Control board 150 is formed by a graphic controller 151 for generating control signals such as a color signal R-G-B, a clock signal CLK and a synchronizing signal SYNC, and a power supplying section 152 for receiving an external power source to generate a driving power source signal. Included as a part of control board 150 is a liquid crystal panel driving circuit 153 for generating the driving signal for liquid crystal panel in response to the control signals and driving power source signal. Here, liquid crystal panel driving circuit 153 mounted to control board 150 and source PCB 356 included into LCD 300 are electrically connected by flexible PCB 120 as shown in FIG. 1.

More specifically, liquid crystal panel driving circuit 153 includes a data latch section 154 for latching to delay color signal R-G-B for a predetermined time interval and supplying the delayed signal, and a timing generator 155 for generating the control signals required for the driving of liquid crystal panel 355 in response to clock signal CLK and sync signal SYNC supplied via data latch section 154. Besides, a voltage generator 156 is provided for generating a gradation voltage required for liquid crystal panel 355 and a gate on/off voltage in response to the driving power source signal.

In addition, the aforementioned signals from liquid crystal panel driving circuit 153 are supplied to liquid crystal panel 355 via flexible PCB 120 and source PCB 365.

Figure 4:
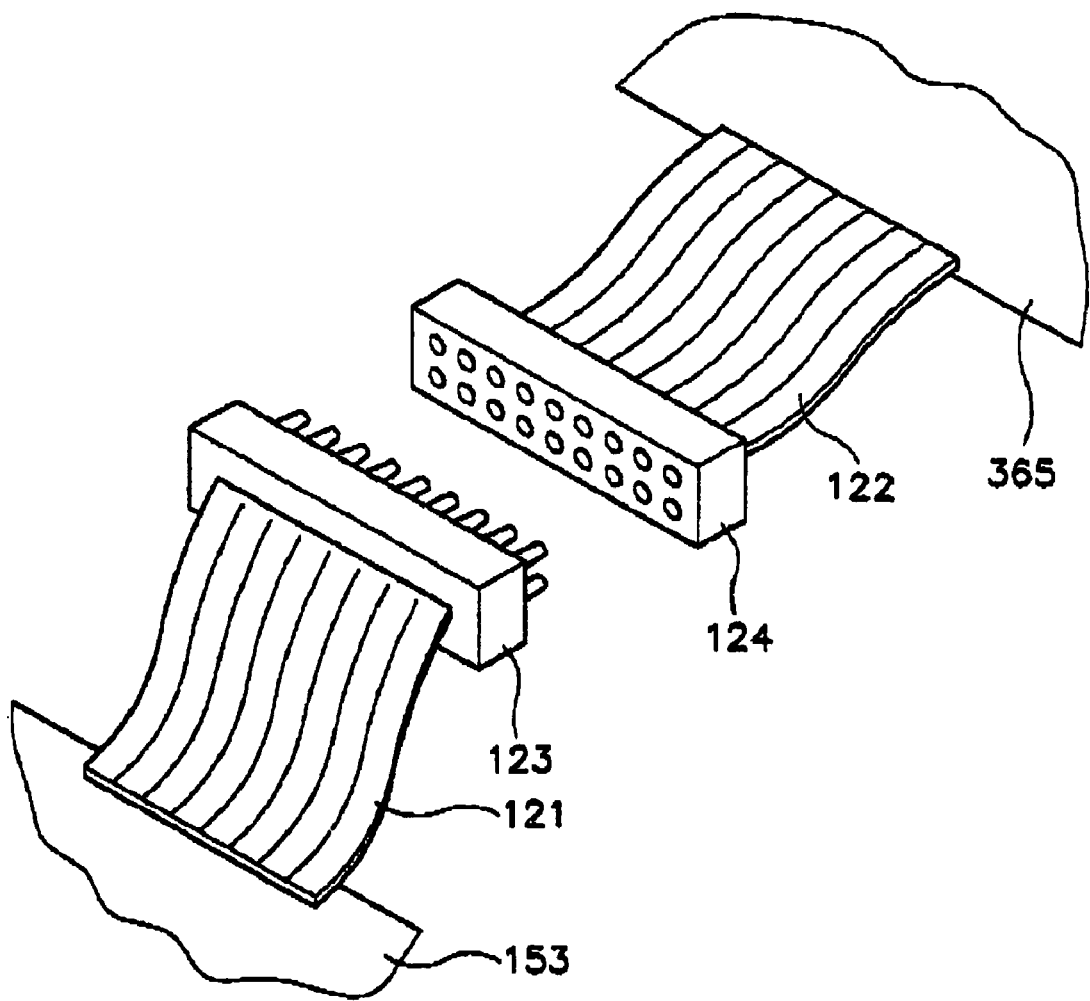
FIG. 4 is a perspective view showing the configuration of the flexible PCB shown in FIG. 1.

Referring to FIG. 4, flexible PCB 120 includes a first flexible PCB 121 extending from liquid crystal panel driving circuit 153 and a second flexible PCB 122 extending from source PCB 365. Also, first and second connectors 123 and 124 are respectively installed to the ends extending from first and second flexible PCBs 121 and 122. A signal transmission path between liquid crystal panel driving circuit 153 and source PCB 365 is secured by connecting first connector 123 and second connector 124.

Here, first connector 123 and second connector 124 can be connected at either the rear plane of backlight assembly 330 and the internal space of main body 100. First flexible PCB 121 and liquid crystal panel driving circuit 153, and second flexible PCB 122 and source PCB 365 are electrically connected by an anisotropic conductive film or solder, in which detailed description on the connecting method will be described later.

Figure 5:
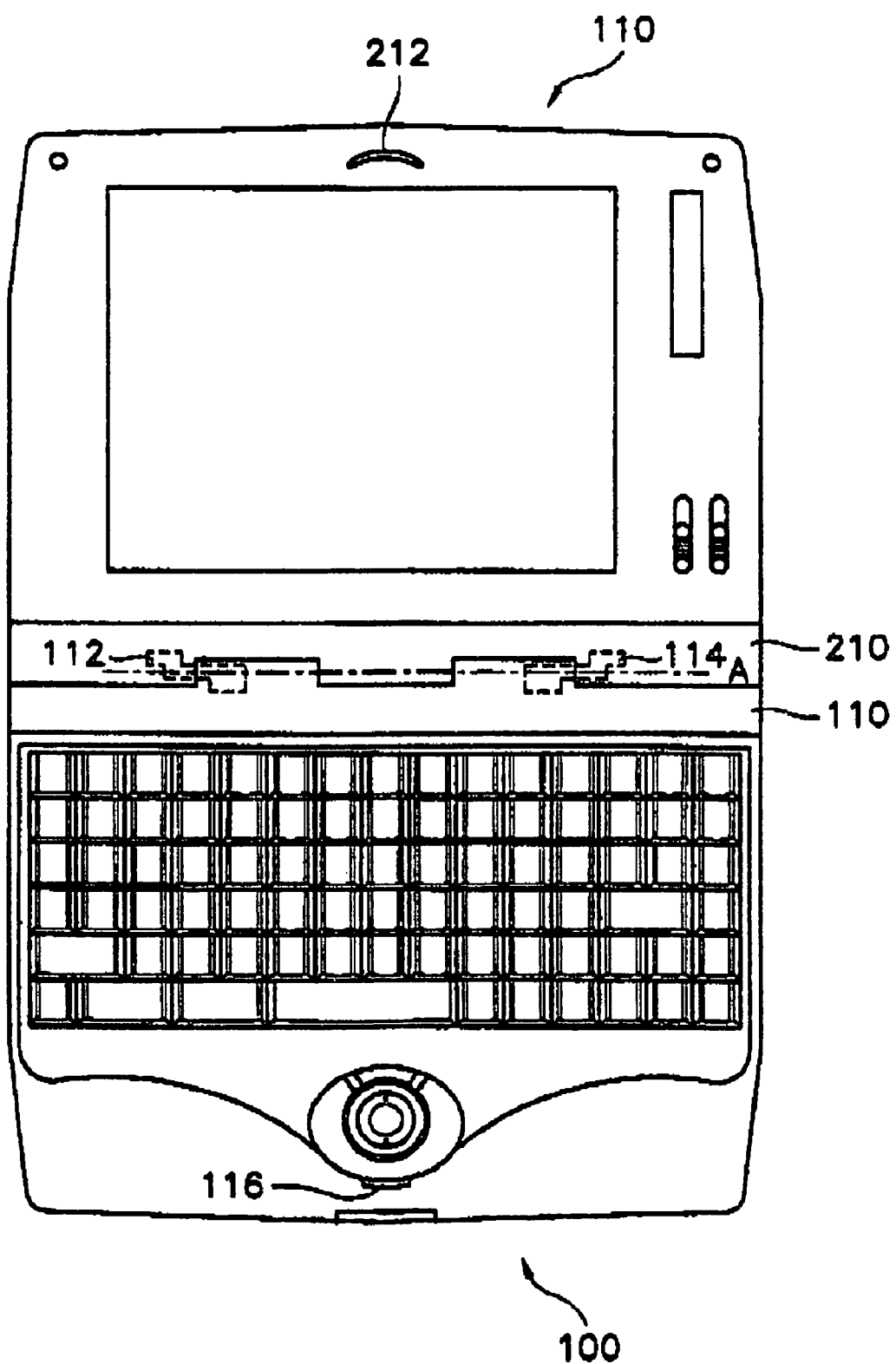
FIGS. 5 and 6 are views for showing the coupling state of the main body of the computer system and monitor system shown in FIG. 1.
Figure 6:
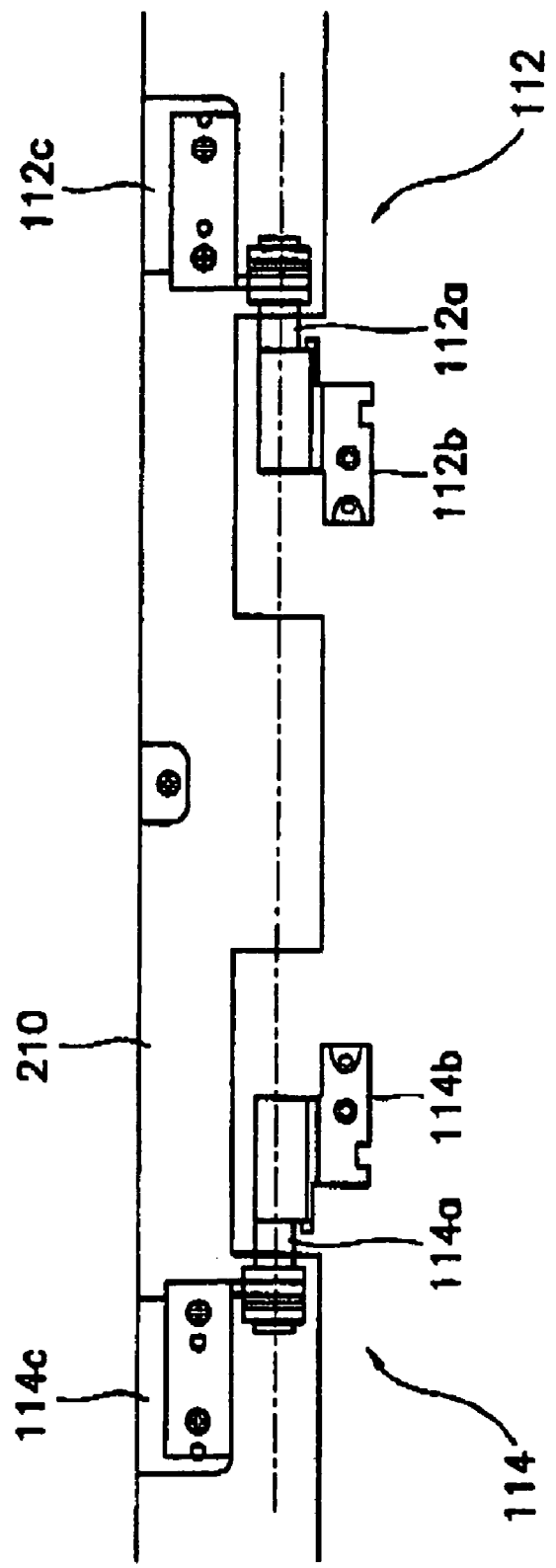

FIGS. 5 and 6 are views showing the method of coupling main body 100 with monitor unit 110.

Referring to FIG. 5, main body 100 and monitor unit 110 are coupled by means of hinges 112 and 114 and latches 212 and 116. Hinges 112 and 114 are installed to portions of placing light source portion 332 of monitor unit 110, i.e., at the thicker side of monitor unit 110, to be coupled to main body 100.

As shown in FIG. 6, hinges 112 and 114 are provided so that a pair of connecting wings 112b & 112c and 114b & 114c are respectively coupled to shafts 112a and 114a in the diagonal direction. Monitor unit 110 is fixedly coupled to main body 100 by means of hinges 112 and 114 and swings by centering about shafts 112a and 114a.

Additionally, the thinner side portion of monitor unit 110, i.e., the portion opposite to the position of installing with light source portion 332, is detached/attached from/onto main body 100 by means of latches 212 and 116.

Figure 7:
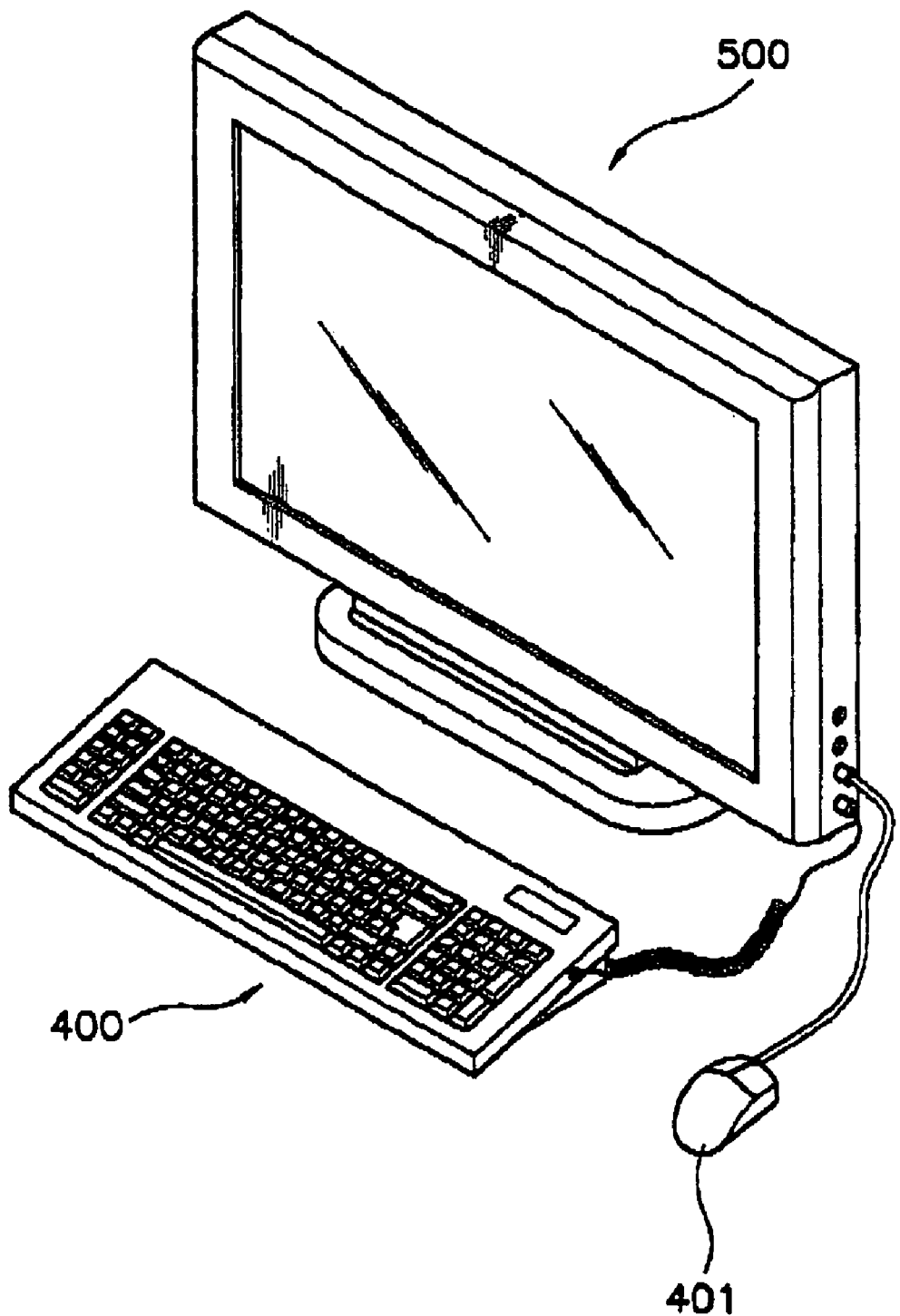
FIG. 7 is a perspective view showing the LCD having the information processing function according to one preferred embodiment of the present invention.

Meantime, main body 100 and monitor unit 110 may be formed in a body by accepting main body 100 to the interior of monitor unit 110, of which one example is illustrated in FIG. 7.

FIG. 7 is a perspective view showing the LCD having an information processing function according to one preferred embodiment of the present invention.

Referring to FIG. 7, the computer system basically has an input unit such as a keyboard 400 and mouse 401, and a monitor unit 500 capable of performing the information processing function having been performed in main body 100 shown in FIG. 1.

Now, the LCD having the information processing function shown in FIG. 7 will be described in detail with reference to FIGS. 7 to 11.

Figure 8:
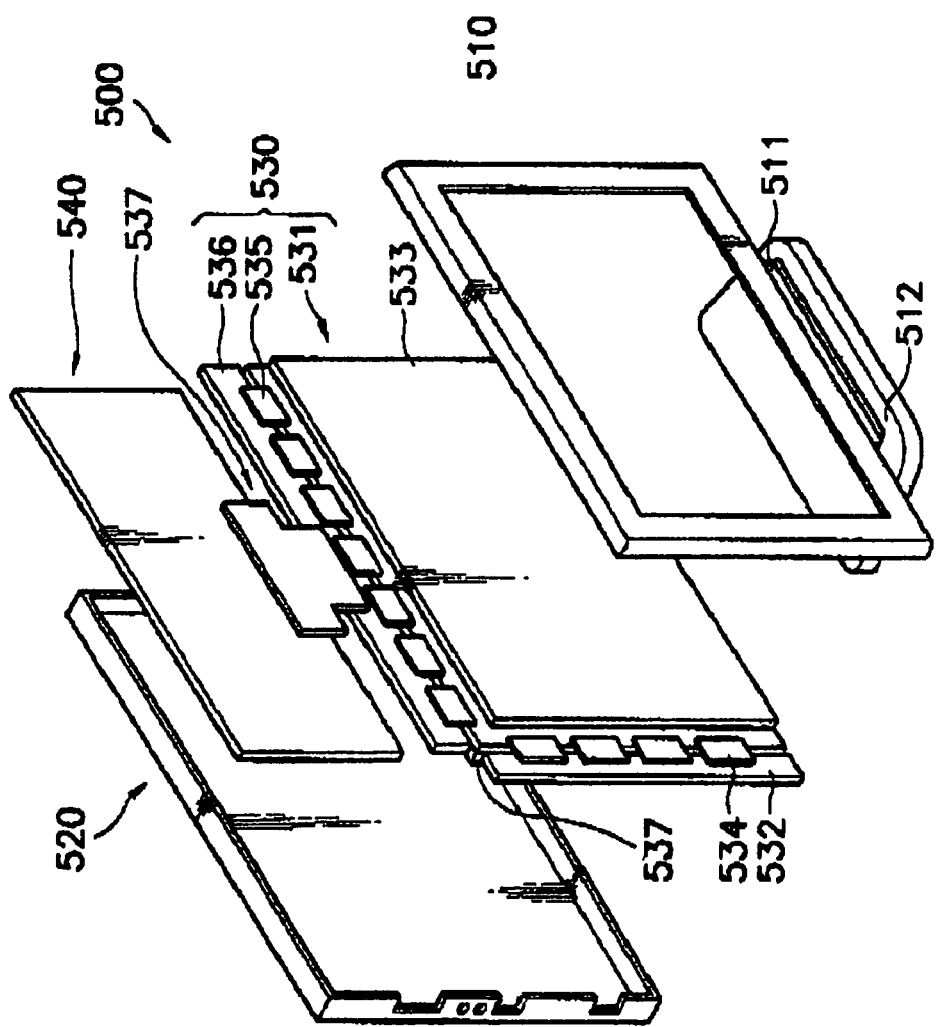
FIG. 8 is an exploded perspective view showing an internal construction of the LCD having the information processing function shown in FIG. 7.
Figure 9:
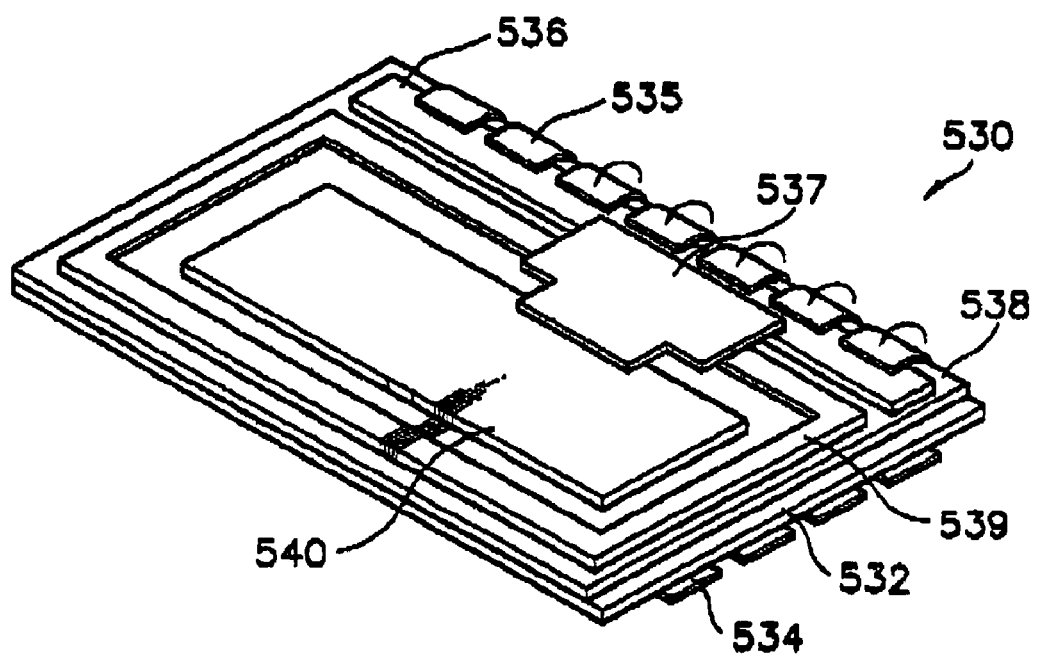
FIG. 9 is a perspective view showing the coupling relation of the information processing module and liquid crystal display module shown in FIG. 7.
Figure 10:
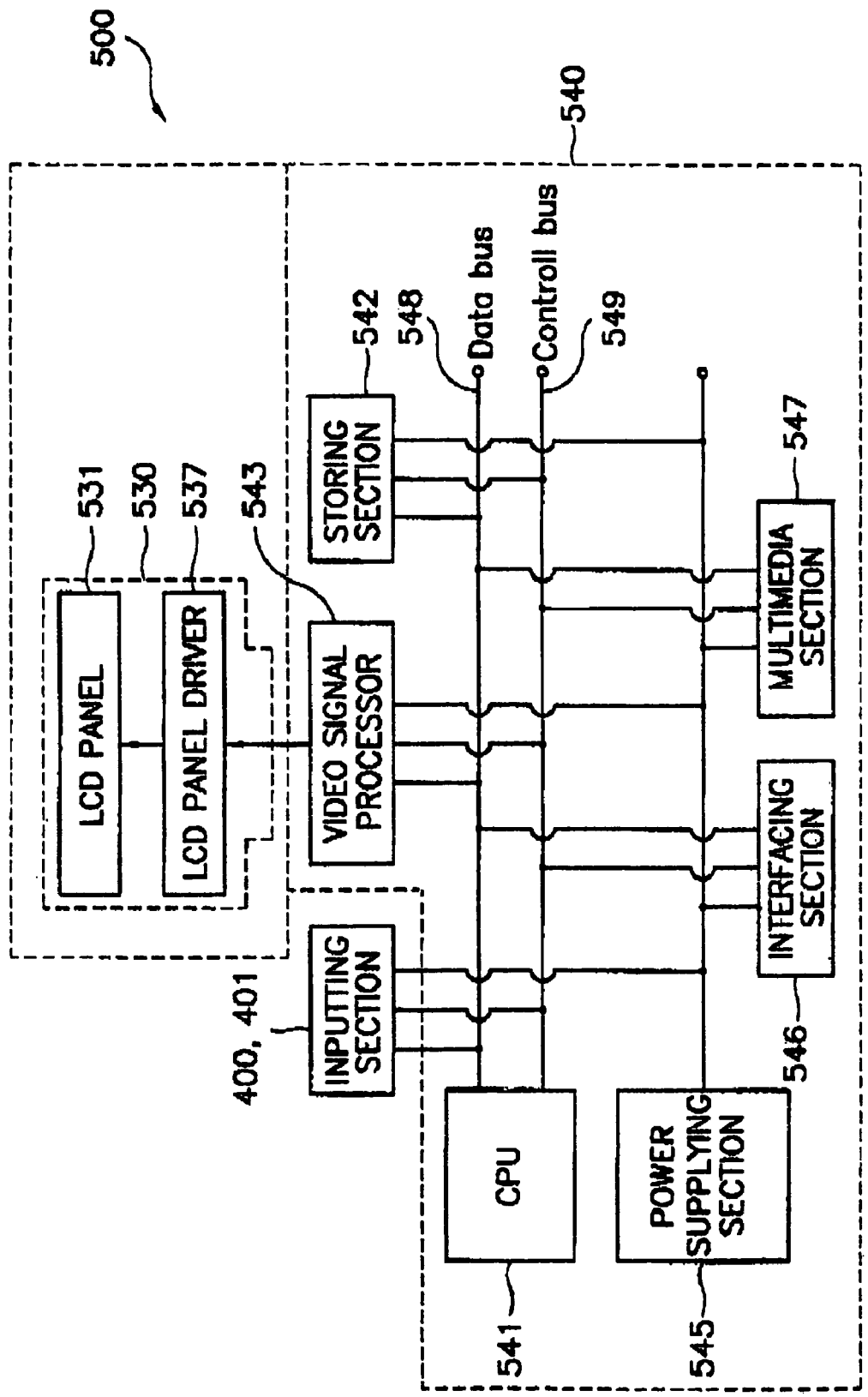
FIGS. 10 and 11 are block diagrams showing the circuit construction of the LCD with the information of the processing function as shown in FIG. 7.
Figure 11:
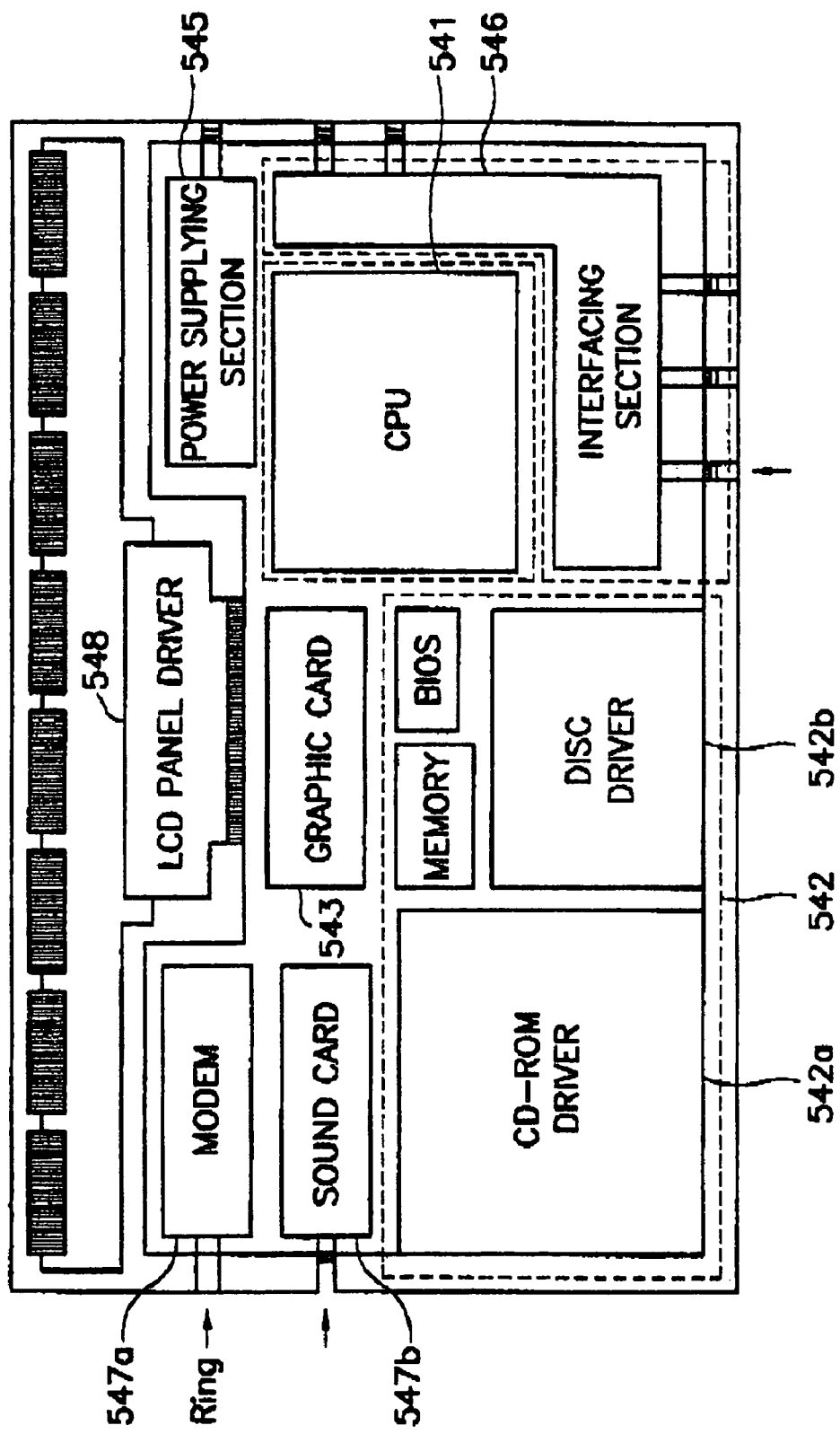

FIG. 8 is an exploded perspective view showing an internal construction of the LCD having the information processing function shown in FIG. 7, and FIG. 9 is a view showing a state of closely attaching an information processing module shown in FIG. 8 to the rear plane of the liquid crystal display module. FIGS. 10 and 11 are block diagrams showing the circuit construction of the LCD having the information processing function shown in FIG. 8 in detail.

Referring to FIG. 8, monitor unit 500 includes a front case 510, a rear case 520 coupled to oppose front case 510, having a receiving space of a predetermined depth, and LCD 500 accommodated between front case 510 and rear case 520 for displaying images.

Front case 510 has a rectangular frame form, and is formed on a stand plate 512 by interposing a hinge 511. Rear case 520 is formed of a substance such as a metal or a metal alloy for blocking electromagnetic wave generated from circuits of LCD 500.

LCD 500 is formed by a liquid crystal display module 530 and an information processing module 540, electrically coupled to liquid crystal display module 530 and accepted into the rear side of liquid crystal display module 530, i.e., between liquid crystal display module 530 and rear case 520.

Liquid crystal display module 530 has a liquid crystal display panel 531, gate and data signal transmission films 534 and 535, a source PCB 536 and a liquid crystal display panel driving circuit 537.

Specifically, liquid crystal display panel 531 includes a TFT substrate 532 formed by a thin film transistor, a pixel electrode, a gate line and a data line. A color filter substrate 533 consisting of a common electrode and R-G-B pixels facing with the pixel electrode of TFT substrate 532 is formed over TFT substrate 532. In spite of not being shown in the drawing, a liquid crystal for varying the permeability of light by the change in the arrangement by means of an electric field forms a layer between TFT substrate 532 and color filter substrate 533.

The gate and data lines of TFT substrate 532 are respectively connected with output terminals of gate signal transmission film 534 and data signal transmission film 535 via an anisotropic conductive film. Also, an input terminal of data signal transmission film 535 is connected with one end portion of source PCB 536 formed with a wiring pattern for signal transmission.

The other end portion of source PCB 536 is electrically connected with liquid crystal panel driving circuit 537 for performing the function described with reference to FIG. 3, and liquid crystal panel driving circuit 537 is electrically connected with information processing module 540. Liquid crystal panel driving circuit 537 processes a driving signal and a timing signal to be received via gate and data signal transmission films 534 and 535 in response to an image signal supplied from an information processing module 540. At this time, the data driving signal supplied to the data line among the driving signals having been processed by liquid crystal panel driving circuit 537, is supplied into data signal transmission film 535 via source PCB 536. Additionally, after passing through source PCB 536 and data signal transmission film 535, the gate driving signal supplied to the gate line among the driving signals having been processed by liquid crystal panel driving circuit 537 is supplied to gate signal transmission film 534 via the pattern for signal transmission formed to TFT substrate 532.

As described above in detail, the method for transmitting the gate driving signal to the gate line by sequentially passing through liquid crystal panel driving circuit 537, source PCB 536, data signal transmission film 535, TFT substrate 532 and gate signal transmission film 534 is embodied by a "one-chip technique," in which the elements of the gate PCB are mounted to liquid crystal panel driving circuit 537, the wiring pattern of the gate PCB is formed onto TFT substrate 532 and then the gate PCB is omitted. Likewise, the elements of source PCB 536 are mounted to liquid crystal panel driving circuit 537, and source PCB 536 is formed with only the wiring pattern for signal transmission. The foregoing one-chip technique is identically applied to liquid crystal display panel assembly 350 shown in FIG. 2.

Meanwhile, although not shown in FIG. 8, backlight assembly 330 and mold frame 310 are sequentially interposed between liquid crystal display panel 531 and rear case 520, as shown in FIG. 2. In addition, chassis 370, as shown in FIG. 2 is interposed between liquid crystal display panel 531 and front case 510 to be coupled to oppose mold frame 310.

Referring to FIG. 9, as described above, information processing module 540 connected with liquid crystal panel driving circuit 537 is closely coupled to mold frame 538 on the rear plane of liquid crystal display panel 531, together with liquid crystal panel driving circuit 537 while data signal transmission film 535 is bent.

At this time, a reinforcing bracket 539 may be installed onto mold frame 538 to firmly fix liquid crystal panel driving circuit 537 and information processing module 540.

When information processing module 540 is accommodated into the interior of LCD 500 as described above, the overall thickness of LCD 500 may be increased in association with the number of elements included into the information processing module 540. However, as described with reference to FIG. 2, the above-stated information processing module 540 is accepted within the receiving space of mold frame 538 provided in the manner that the thickness of light-conducting plate 331 becomes gradually thinner as it is being further distanced from light source portion 332. Also, in liquid crystal display module 530 as described above, the number of PCBs to be received by liquid crystal display module 530 is decreased and the elements become compact by the one-chip technique. Thus, the thickness of LCD 500 hardly increases. Once information processing module 540 is accommodated within the interior of LCD 500 as described above, it is advantageous in that the space having been occupied by the main body of the computer system can be utilized for another use when the main body of the computer system and monitor unit are separately formed.

Referring to FIG. 10, information processing module 540 has a central processing unit CPU 541 for generating the control signals, a storing section 542 for storing or outputting data, and a video signal processor 543 for processing video data to supply it to liquid crystal panel driving circuit 537. In addition, there is provided a power supplying section 545 for supplying electric power, an interfacing section 546 for interfacing data with an external information processing module, and a multimedia section 547. These sections transmit the data and signals via a data bus 548 and a control bus 549 formed to a main board (not shown). Here, storing section 542 is formed by at least one selected among a ROM, a RAM, a hard disc drive and an optical disc.

Referring to FIG. 11, information processing module 540 as described above may be added with functions required by a user. For example, a modem 547a for performing the external communication, a sound card 547b for playing or recording sound, a graphic card 543, etc. may be added.

Meanwhile, as described above, the information processing module accommodated within the LCD may selectively perform only the partial functions of information processing module 540 as shown in FIGS. 10 and 11.

For example, information processing module 540 may be formed by just an analog-digital converter electrically connected to liquid crystal panel driving circuit 840 to convert analog signals to digital signals.

Figure 12:
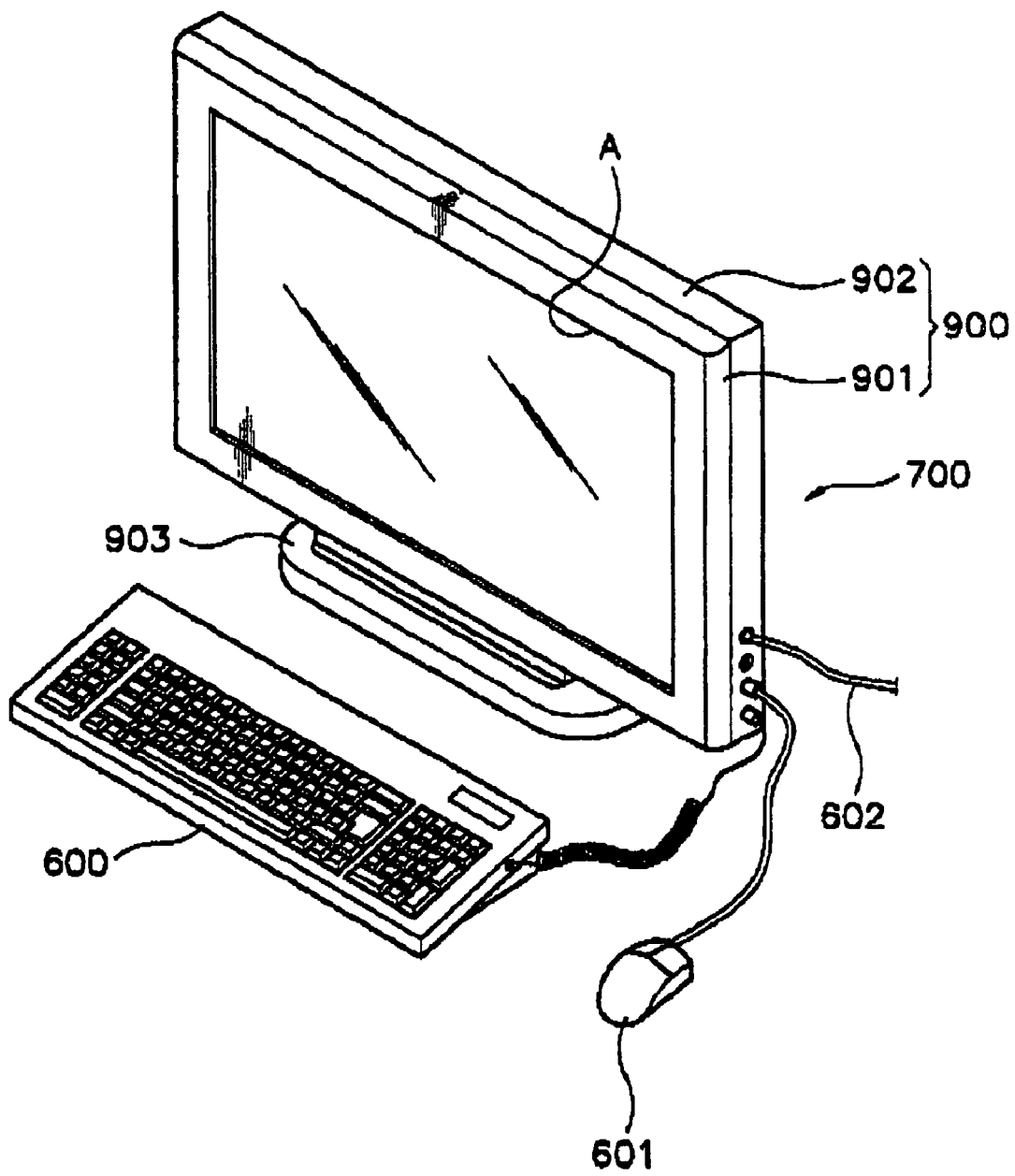
FIG. 12 is a perspective view showing the LCD having the information processing function according to a preferred embodiment of the present invention.

In this case, as shown in FIG. 12, in addition to a monitor unit 900 having an analog-digital converter 870, and an input unit such as a keyboard 600 and a mouse 601, a main body (not shown) performing the function as information processing module 540 shown in FIG. 8 is to be separately furnished.

At this time, monitor unit 900 and the main body are electrically connected by a connection line, designated by reference numeral "602."

Figure 13:
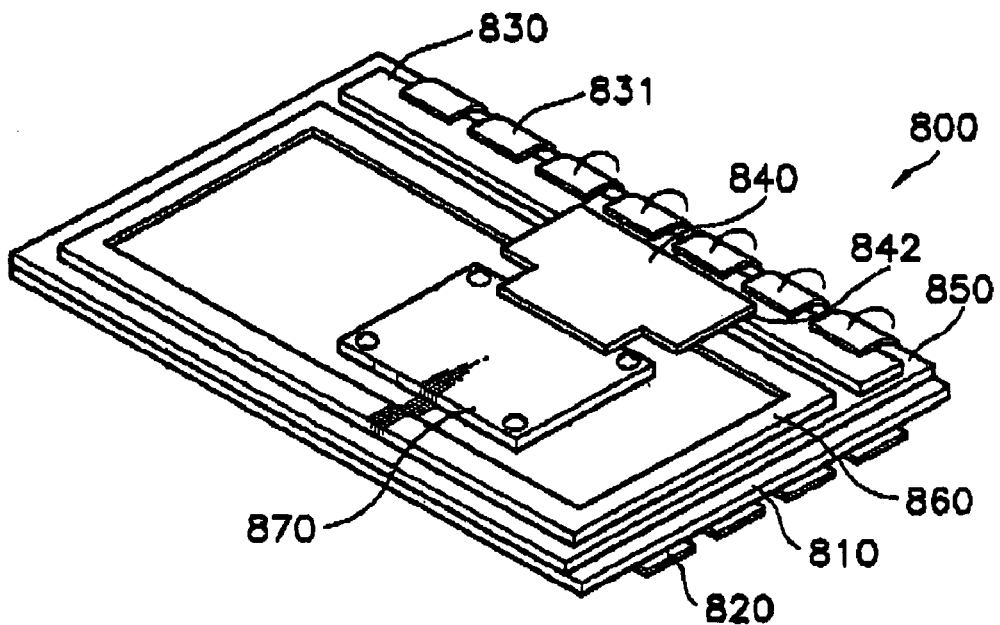
FIG. 13 is a perspective view showing an internal construction of the LCD with the information of the processing function as shown in FIG. 12.

Also, referring to FIG. 13, analog-digital converter 870 is accepted by the same way as information processing module 540 shown in FIG. 9. In other words, analog-digital converter 870 is closely attached to the rear plane of mold frame 850 together with liquid crystal panel driving circuit 840 by the bending of data signal transmission film 831. In the same manner, a reinforcing bracket 539 is installed on mold frame 538 to firmly fix liquid crystal panel driving circuit 840 and analog-digital converter 870. Then, analog-digital converter 870 is closely coupled to reinforcing bracket 860 by means of screws 871, 872, 873 and 874. In FIG. 13, the other elements of monitor unit 900 that are not described, perform the same functions as those of the corresponding components of liquid crystal display module 530 shown in FIG. 8.

On the other hand, referring back to FIG. 9, information processing module 540, liquid crystal panel driving circuit 537 and source PCB 536 are directly coupled with one another without using a separate connecting member such as the flexible PCB.

Furthermore, analog-digital converter 870, liquid crystal panel driving circuit 840 and source PCB 830 shown in FIG. 13 are also directly connected with one another without using a separate connecting member.

Figure 14:
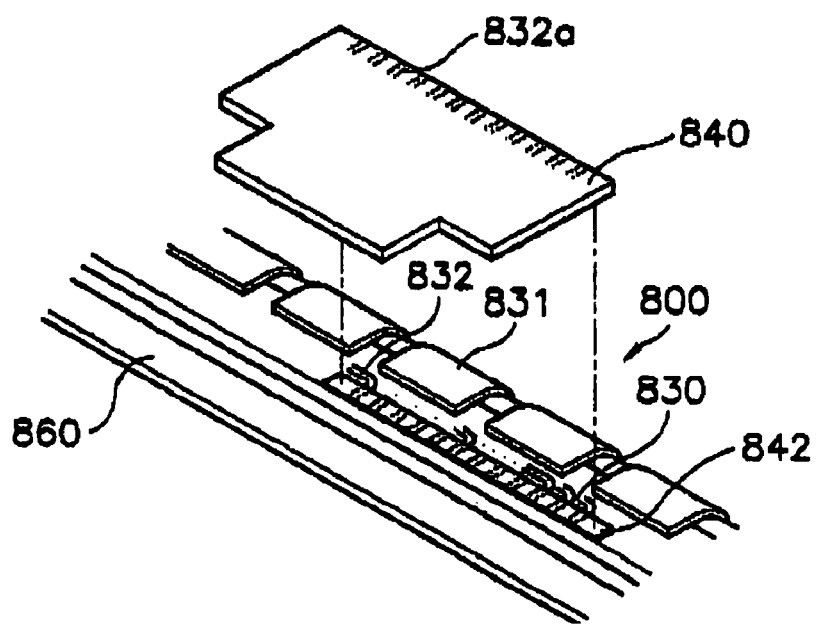
FIG. 14 is an exploded perspective view showing the coupling construction of the liquid crystal panel driving circuit and source PCB shown in FIG. 13.

To attain such a coupling, as shown in FIG. 14, a coupling terminal 842 is formed between liquid crystal panel driving circuit 840 and source PCB 830. Coupling terminal 842 is formed by the anisotropic conductive film or solder which affords an excellent electrothermosensitive power and an outstanding coupling force.

Moreover, liquid crystal panel driving circuit 840 and source PCB 830 are respectively formed with wiring patterns 832 and 832a for signal transmission. Then, via wiring patterns 832 and 832a for signal transmission, the signal is transmitted between liquid crystal panel driving circuit 840 and source PCB 830.

Figure 15:
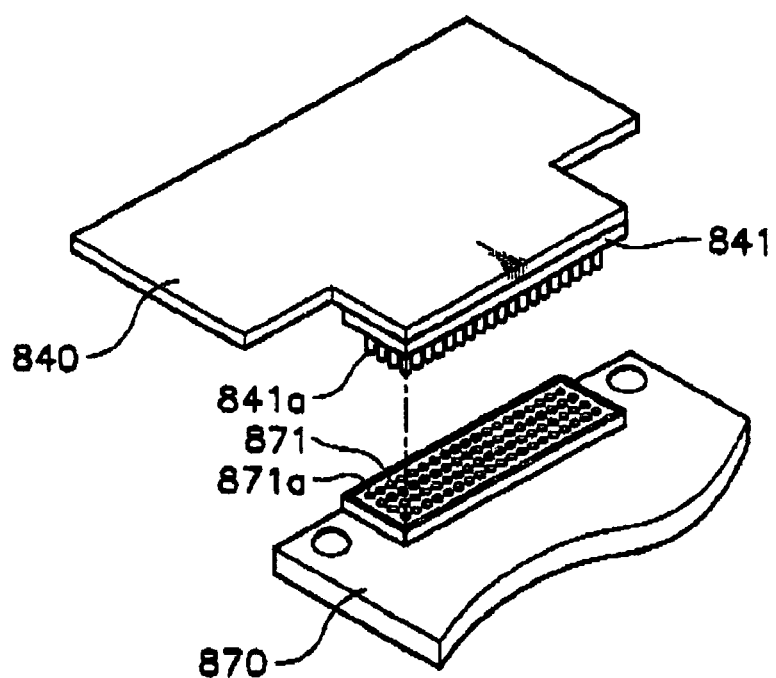
FIGS. 15 and 16 are views showing the coupling construction of the information processing module and liquid crystal display module shown in FIG. 13, respectively.
Figure 16:
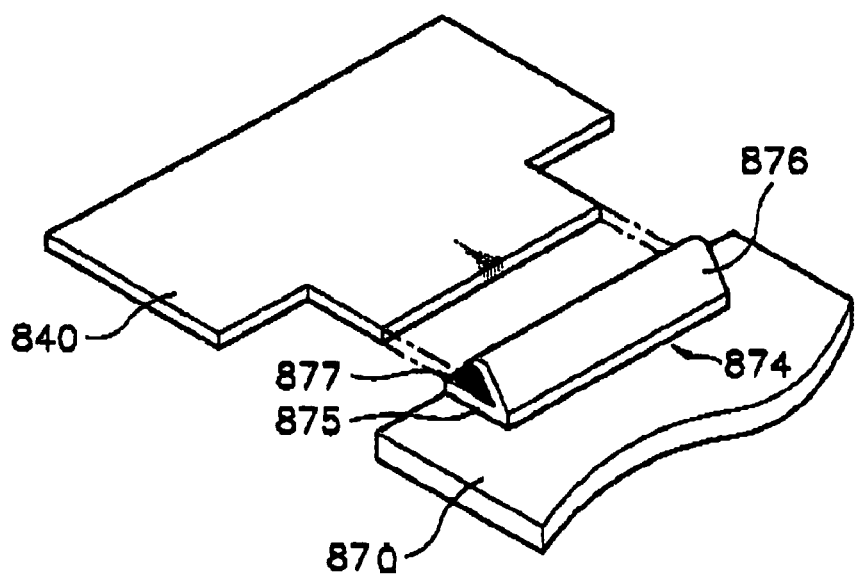

Referring to FIGS. 15 and 16 which illustrate the coupling relation of the information processing module and liquid crystal panel driving circuit, liquid crystal panel driving circuit 840 and analog-digital converter 870 are electrically connected by means of a socket or biting connector.

As shown in FIG. 15, an upper socket 841 and a lower socket 871 are respectively mounted to the planes of mutually connecting liquid crystal panel driving circuit 840 and analog-digital converter 870. At this time, upper socket 841 is arranged with a plurality of contact pins 841a having a conductivity, and lower socket 871 is arranged with a plurality of contact holes 871a having the conductivity alike. Therefore, by coupling upper socket 841 and lower socket 871 to face each other, liquid crystal panel driving circuit 840 and analog-digital converter 540a are electrically connected to each other.

In addition, as shown in FIG. 16, biting connector 874 is mounted onto the portion of analog-digital converter 870 connected with liquid crystal panel driving circuit 840, to electrically connect analog-digital converter 870 with liquid crystal panel driving circuit 840. At this time, biting connector 874 is provided with an upper plate 876 and a lower plate 875 in the form of tongs.

A wiring pattern 877 for signal transmission is formed on the upper plane of lower plate 875, i.e., the portion of being connected with liquid crystal panel driving circuit 840. Also, a wiring pattern (not shown) for signal transmission is formed to a portion of liquid crystal panel driving circuit 840 corresponding to wiring pattern 877 for signal transmission of lower plate 875.

The coupling method of liquid crystal panel driving circuit 840 and analog-digital converter 870 using biting connector 874 is as follows. First, liquid crystal panel driving circuit 840 is inserted between upper plate 876 and lower plate 875 of biting connector 874. Then, upon pressing down upper plate 876 of biting connector 874, wiring pattern 877 for signal transmission formed to lower plate 875 and the wiring pattern (not shown) for signal transmission of liquid crystal panel driving circuit 840, electrically contact with each other to secure a signal transmission path between liquid crystal panel driving circuit 840 and analog-digital converter 870.

The method for electrically connecting liquid crystal panel driving circuit 840 with analog-digital converter 870 by using the socket or biting connector as described above is identically applied to the method for electrically connecting liquid crystal panel driving circuit 537 and information processing module 540 shown in FIG. 9.

According to the LCD and information processing apparatus as described above, the liquid crystal panel driving circuit for generating the driving signal to drive the liquid crystal panel, is mounted to the main body of the computer system. The driving signal from the liquid crystal panel driving circuit is supplied to the source PCB formed with the wiring pattern for signal transmission via the flexible PCB.

The chassis, mold frame, front and rear cases of the LCD are fabricated in the form of corresponding to the light-conducting plate of the backlight assembly for minimizing the space between the liquid crystal display module and mold frame produced by eliminating the liquid crystal panel driving circuit from the LCD. That is, as the chassis, mold frame, front and rear cases are further distanced from the position of receiving the light source portion, the depth of the receiving space becomes shallow as the exposure plate.

Accordingly, when the chassis, mold frame, front and rear cases are assembled for receiving the liquid crystal display module, the side thickness of the LCD becomes thinner as being further distanced from the position of receiving the light source portion with the consequence of making the thickness of the LCD slim.

Meantime, in connection with the trend of the gradual decrease in the number of the PCBs to be received into the liquid crystal display module and of the high integration of the elements applied to the computer system by the one-chip technique, the information processing module mounted to the main body may be furnished between the mold frame and rear case. Upon accepting the information processing module into the interior of the LCD as above, there is an advantage that the space having been occupied by the main body of the computer system when the main body of the computer system and the monitor system are separately provided, may be utilized for another use.

Furthermore, only one among several functions of the information processing module as the analog-digital converter may be selectively furnished between the mold frame and rear case as the analog-digital converter. When the information processing module is placed into the internal space of the LCD as described above, the information processing module, liquid crystal panel driving circuit and source PCB are directly connected by using the anisotropic conductive film or solder. Consequently, while the generation of the electromagnetic wave resulting from using the separate connecting member such as the flexible PCB is minimized, the product performance of the LCD can be maximized.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A liquid crystal display (LCD), comprising:
   a monitor unit, comprising:
   a backlight assembly having a light source;
   an LCD panel arranged on the backlight assembly;
   a mold frame receiving the backlight assembly and the LCD panel;
   a chassis coupled to the mold frame to fix the backlight assembly and the LCD panel therebetween;
   a reinforcing member combined with the mold frame and having an opening;
   an information processing module disposed on a rear surface of the mold frame and in the opening of the reinforcing member, the information processing module including a central processing unit generating control signals and a video signal processing unit generating video signals;
   a printed circuit board (PCB) coupled between the information processing module and the LCD panel, the PCB receiving the video signals from the information processing module and generating and providing a gate driving signal and a data driving signal to the LCD panel; and,
   an input unit provided externally to the monitor unit and connected to the information processing module.

2. The LCD of claim 1, wherein the information processing module further comprises data storage that stores and supplies data in response to the control signal from the central processing unit.

3. An information processing apparatus, comprising:
   a liquid crystal display (LCD) module, including:
   a backlight assembly having a light source;
   an LCD panel arranged on the backlight assembly;
   a mold frame receiving the backlight assembly and the LCD panel;
   a chassis coupled to the mold frame to fix the backlight assembly and the LCD panel therebetween;
   a reinforcing member combined with the mold frame and having an opening;
   an information processing module disposed on a rear surface of the mold frame and in the opening of the reinforcing member, the information processing module comprising a central processing unit generating control signals and a video signal processing unit generating video signals;
   a printed circuit board (PCB) coupled between the information processing module and the LCD panel and receiving the video signals from the information processing module and generating and providing a gate driving signal and a data driving signal to the LCD panel; and,
   an input unit provided externally to the LCD module and connected to the information processing module.

4. The information processing apparatus of claim 3, wherein the information processing module further comprises data storage that stores or supplies data in response to the control signals from the central processing unit.

5. The information processing apparatus of claim 4, further comprising a front case and a rear case coupled to the front case, wherein the backlight assembly, the LCD panel, the mold frame, the chassis and the information processing module are fixed between the front case and the rear case.

6. The information processing apparatus of claim 4, wherein the data storage comprises at least one selected from the group consisting of ROM, RAM, a hard disc drive and an optical disc.

7. The information processing apparatus of claim 4, wherein the information processing module further comprises:
- an interfacing unit connected to the input unit;
- a sound control unit that plays and records sound; and,
- a communicating unit that performs communication with an external device.

8. A display device, comprising:
- a liquid crystal display (LCD) module, including:
- a backlight assembly having a light source and a rear surface;
- an LCD panel arranged on the backlight assembly;
- a mold frame receiving the backlight assembly and the LCD panel and extending over substantially the entire rear surface of the backlight assembly; and,
- a chassis coupled to the mold frame to fix the backlight assembly and the LCD panel therebetween;
- a reinforcing member combined with the mold from and having an opening;
- an information processing module attached to a rear surface of the mold frame and disposed in the opening of the reinforcing member, the information processing module comprising a central processing unit generating control signals and a video signal processing unit generating video signals;
- a printed circuit board (PCB) coupled between the information processing module and the LCD panel and receiving the video signals from the information processing module and generating and providing a gate driving signal and a data driving signal to the LCD panel; and,
- an input unit provided externally to the LCD module and connected to the information processing module.

9. The display device of claim 8, further comprising a front case and a rear case coupled to the front case, wherein the backlight assembly, the LCD panel, the PCB, the mold frame, the chassis and the information processing module are fixed between the front case and the rear case.

10. The display device of claim 8, wherein the information processing module further comprises data storage that stores and supplies data in response to the control signals from the central processing unit.

11. The display device of claim 10, wherein the data storage comprises at least one selected from the group consisting of ROM, RAM, a hard disc drive and an optical disc.

12. The display device of claim 10, wherein the information processing module further comprises:
- an interfacing unit connected to the input unit;
- a sound control unit that plays and records sound; and,
- a communicating unit that performs communication with an external device.

\* \* \* \* \*